US011585457B2

(12) United States Patent
Lindoerfer et al.

(10) Patent No.: US 11,585,457 B2
(45) Date of Patent: Feb. 21, 2023

(54) VALVE DRIVE WITH SNAP FUNCTION

(71) Applicant: VOITH PATENT GMBH, Heidenheim (DE)

(72) Inventors: Steffen Lindoerfer, Schrozberg (DE); Armin Goll, Mulfingen (DE); Walter Notar, Weissenhorn (DE); Harald Schuster, Blaubeuren (DE); Martin Werner, Langenau (DE)

(73) Assignee: Voith Patent GmbH, Heidenheim (DE)

( * ) Notice: Subject to any disclaimer, the term of this patent is extended or adjusted under 35 U.S.C. 154(b) by 195 days.

(21) Appl. No.: 16/960,740

(22) PCT Filed: Dec. 21, 2018

(86) PCT No.: PCT/EP2018/086452
§ 371 (c)(1),
(2) Date: Jul. 8, 2020

(87) PCT Pub. No.: WO2019/137795
PCT Pub. Date: Jul. 18, 2019

(65) Prior Publication Data
US 2020/0355292 A1 Nov. 12, 2020

(30) Foreign Application Priority Data
Jan. 11, 2018 (DE) ...................... 10 2018 100 519.9

(51) Int. Cl.
*F16K 31/04* (2006.01)
(52) U.S. Cl.
CPC .......... *F16K 31/042* (2013.01); *F16K 31/043* (2013.01)

(58) Field of Classification Search
CPC ....... F16K 31/047; F16K 31/56; F16K 31/043
See application file for complete search history.

(56) References Cited

U.S. PATENT DOCUMENTS

| 3,512,421 | A | 5/1970 | Anderson |
| 5,497,672 | A | 3/1996 | Appleford et al. |
| 5,832,944 | A | 11/1998 | Lindner |
| 6,129,333 | A | 10/2000 | Ma |
| 6,972,653 | B2* | 12/2005 | Czeppel ................ F16K 31/003 335/220 |
| 8,047,766 | B2 | 11/2011 | Goll |

(Continued)

FOREIGN PATENT DOCUMENTS

| DE | 4446605 A1 | 6/1996 |
| DE | 29801229 U1 | 5/1998 |

(Continued)

*Primary Examiner* — Angelisa L. Hicks
(74) *Attorney, Agent, or Firm* — Laurence A. Greenberg; Werner H. Stemer; Ralph E. Locher

(57) ABSTRACT

A valve drive with a snap function includes a rotary drive input, a lead screw connected to or formed by the rotary drive input, a slide in threaded engagement with the lead screw to form a screw thread, the slide being mechanically connected or connectable to a valve body and being movable in the direction of a longitudinal axis. A bearing housing is provided in which the lead screw is mounted so as to be rotatable about the longitudinal axis and stationary in the direction of the longitudinal axis. The bearing housing is held against a displacement along the longitudinal axis by a releasable locking device, countering the preload force of a snap spring.

23 Claims, 3 Drawing Sheets

(56) References Cited

U.S. PATENT DOCUMENTS

| | | | |
|---|---|---|---|
| 8,398,051 B2* | 3/2013 | Grimseth | F16K 31/56 |
| | | | 251/68 |
| 8,523,142 B2* | 9/2013 | Mann | F16K 3/0254 |
| | | | 251/74 |
| 2014/0209196 A1 | 7/2014 | Goll | |

FOREIGN PATENT DOCUMENTS

| | | | | |
|---|---|---|---|---|
| DE | 102013003976 A1 | | 7/2014 | |
| EP | 0981001 A2 | | 2/2000 | |
| EP | 2110592 A2 | | 10/2009 | |
| GB | 2383627 A | * | 7/2003 | F16K 31/04 |
| WO | 0114775 A1 | | 3/2001 | |
| WO | WO-2008091202 A1 | * | 7/2008 | F16K 31/003 |
| WO | 2010128952 A2 | | 11/2010 | |

* cited by examiner

VALVE DRIVE WITH SNAP FUNCTION

BACKGROUND OF THE INVENTION

Field of the Invention

The present invention relates to a valve drive with a snap function, in particular a snap-close function, as well as a valve having such a valve drive and the use of such a valve drive.

Valves with a snap-close function or valve drives for this purpose are used, for example, in steam turbines in order to be able to stop the steam supply to a steam turbine as quickly as possible in the event of load shedding. Such a snap-close valve or the valve drive therefor, as the present invention relates to according to one embodiment, has only the snap-close function, without an additional regulating or control function; thus, for regulation or control, the snap-close valve must be connected in series with a regulating or control valve. In another application, such as the present invention likewise relates to, the valve is designed as a combination valve and the valve drive accordingly has a regulating or control function and the snap-close function mentioned.

Accordingly, in valve drives such as the present invention, in the first-mentioned case it may be sufficient if the valve drive is able to move a valve body between a fully closed position of the valve and a fully open position of the valve; in the second use case, in contrast, the valve drive is able to move the valve body into stable intermediate positions between the fully closed state and the fully open state of the valve in order to variably adjust a flow cross-section.

Valve drives with a prior art snap-close function have an energy accumulator, in this case called a snap-close spring, which, when the snap-close function is triggered, applies the necessary actuating force to move the valve quickly into the closed position. The snap-close spring acts permanently in the direction of a closing position of the valve drive, or in the direction of a closing movement of the valve drive, and in control processes it is more or less tensioned by moving the valve body accordingly. In order to ensure that the valve closes sufficiently quickly and safely in the event of a snap-close situation, the snap-close spring has a considerable closing force, which must therefore be permanently overcome or maintained when the valve body is moved. If hydraulically operated valve drives are used, these high closing forces of the snap-close spring do not pose a problem. The example of DE 10 2013 003 976 discloses an example of a snap-close valve with a hydraulic actuator.

In order to avoid the considerable system and maintenance effort required for hydraulically operated snap-close valves, electromechanical drives were proposed, in which an electric motor adjusts the valve body by means of a suitable worm gear that converts the electric motor's rotary movement into a linear movement Exemplary embodiments are disclosed in EP 2 110 592 A2 and DE 44 46 605 A1. A drawback of these embodiments is that the electric motor must permanently work against the closing force of a snap-close spring during adjustment of the valve spindle, which ensures the snap-close function. Accordingly, the electric motor must be of a correspondingly strong design and be capable of maintaining this closing force over long periods of time.

EP 0 981 001 A2 discloses a valve drive with a snap-close function, wherein the valve drive is driven by means of an electric motor via a linear actuator, and during normal control operation of the valve, the spring force of the snap-close spring is decoupled from the adjusting force of the electric motor. For example, the electric motor moves a spindle along a longitudinal axis by means of the linear actuator, in order to move a valve body in the direction of this longitudinal axis as a result. The spindle is connected to the valve stem via a snap-close mechanism, and in a locked position, the snap-close mechanism positively connects the spindle to the valve stem and, when the spindle moves to a snap-close position, releases the lock so that two parts of the snap-close mechanism are moved apart by the force of a preloaded snap-close spring so as to move the valve stem away from the spindle and as a result close the valve. Because the locking mechanism blocks the spring force of the snap-close spring solely by locking in the locked position, this spring force does not load the drive. A drawback of this embodiment is the comparatively complicated mechanism for safely holding the spring force of the snap-close spring, while at the same time guaranteeing safe triggering of the snap-close function and safe movement of the mechanism into its locked position.

SUMMARY OF THE INVENTION

The object of the present invention is to create a valve drive, based on the cited prior art with a decoupling of the force of the snap-close spring from the driving force in an unreleased snap-close condition, the structure of which is mechanically less complex and thus works more reliably in practice. The structure should also be characterized by a compact and comparatively cost-effective design.

The object of the invention is accomplished by a valve drive with a snap function, comprising a rotary drive input, a lead screw connected to or formed by the rotary drive input, a slide in threaded engagement with the lead screw to form a screw thread, the slide being mechanically connected or connectable to a valve body and movable in the direction of a longitudinal axis, a bearing housing in which the lead screw is mounted so as to be rotatable about the longitudinal axis and stationary in the direction of the longitudinal axis, and the bearing housing being held against a displacement along the longitudinal axis by a releasable locking device, countering the preload force of a snap spring. The additional claims specify preferred and particularly expedient configurations of the invention as well as a valve and the use of a valve drive according to the invention.

A valve drive according to the invention comprises a rotary drive input and a lead screw connected to the rotary drive input or formed by this rotary drive input. The lead screw engages with a slide to form a worm gear. Accordingly, a rotary movement at the rotary drive input is converted into a linear movement of the slide, and the slide may move along a longitudinal axis.

The slide is mechanically connected or connectable to a valve body in order to move a connected valve body relative to a valve seat by moving the slide in the direction of the longitudinal axis in accordance with a connected valve body in order to open and/or close a valve.

The valve drive has a snap function that is either a snap-close function or a snap-release function. As a result, the valve drive may be moved abruptly in the event of triggering, so as to move a connected valve into a closed or open position.

According to one embodiment, the valve is designed as an on-off valve, i.e. the valve body may only be moved between a fully open position of the valve and a closed position of the valve, without stable intermediate positions, or the valve is designed as a regulating or control valve, in which the valve body may additionally be moved into stable intermediate positions between an open position and a closed position of the valve. In the first case, the valve drive has only one snap function, in particular a snap-close function; in the second case it additionally has a controlling or regulating function.

According to the invention, the valve drive comprises a bearing housing in which the lead screw is mounted so as to be rotatable about the longitudinal axis and stationary in the direction of the longitudinal axis. Thus, the lead screw is not moved within the bearing housing or relative to the bearing housing in the direction of the longitudinal axis, namely in the spindle's axial direction.

The bearing housing is held against the preload force of a snap spring by means of a releasable locking device, in particular a snap-close spring, against displacement in the direction of the longitudinal axis. Thus, for a snap-close or snap-release of the valve, the locking device may be released and the entire bearing housing with the lead screw mounted therein may be moved in the direction of the longitudinal axis, driven by the force of the snap spring as it is released. At the same time, the locking device, in the locked state, prevents the preload force of the snap spring from acting on the rotary drive input.

The fact that the entire bearing housing may be moved by the spring force of the snap spring means that the locking device does not require a complicated structure. For example, it is possible to furnish the locking device on the outside of the bearing housing, where corresponding installation space is available. Preferably, however, the locking mechanism is positioned radially inside the snap spring, which may have a comparatively large diameter due to its corresponding radial outer arrangement, and may therefore be particularly strong.

Preferably, the bearing housing comprises or is formed by a hollow cylinder that encloses bearing positions, in particular rolling bearings, and at least one axial section of the lead screw which is mounted in the bearing positions. Thus, for example, the lead screw may have a first axial section that is mounted in the bearing positions and does not have a thread, and an adjoining second axial section that has a thread, in particular an external thread, on which the slide is arranged with a corresponding counter-thread, in particular an internal thread, for the displacement of the slide.

For example, the snap spring is designed as a compression spring or compression coil spring and, as shown, preferably encloses the bearing housing radially on the outside. In principle, however, configurations are also possible in which the snap spring is furnished radially inside the bearing housing.

According to an exemplary embodiment of the invention, the locking device comprises at least one hook-shaped latch that is movable in the radial direction relative to the bearing housing in such a way that in a first position, the locked position, it engages positively in the bearing housing; and in a second position, the snap position, in particular the snap-close position, it releases the engagement in the bearing housing, so that in this snap or snap-close position the bearing housing moves in the direction of the longitudinal axis when the preload force of the snap spring acts on it. In the locked position, the hook-shaped latch preferably engages radially from the outside into the bearing housing.

According to one embodiment of the invention, a plurality of hook-shaped latches are furnished that are arranged distributed around the circumference of the bearing housing.

For example, a control ring is furnished that encloses the at least one hook-shaped latch in the radial direction and is movable in the direction of the longitudinal axis between a first position in which it blocks the at least one latch to prevent the latch from moving from the locked position to the snap position, and a second position in which it allows the latch to move from the locked position to the snap position. If a plurality of latches are furnished, they are preferably enclosed together by one and the same control ring.

The at least one latch is preferably designed as a self-opening latch. Consequently, if the snap spring applies force to the bearing housing in the direction of the longitudinal axis and releases the blockage of the at least one latch blocking the movement thereof from the locked position to the snap position, for example because the control ring has been correspondingly displaced, the preload force of the snap spring alone and the configuration of the engagement surfaces between the latch and the bearing housing are sufficient to move the latch to the snap position.

The control ring, for example, is held in its first position by a magnetic actuator against a spring force, so that in this position it blocks the latch from leaving the locked position.

A spring accumulator may be furnished that generates the spring force for the control ring, with the spring accumulator preferably comprising a spring system that has at least a first spring and a second spring, for example having mutually different spring characteristic curves, the first spring being effective only over part of a travel range of the second spring in order to generate a comparatively increased breakaway force when the control ring moves from its first position to the second position. For example, the spring system comprises at least one disc spring as the first spring and at least one spiral compression spring as the second spring.

According to one embodiment of the invention, the rotary drive input comprises an input wheel, in particular an input gear wheel, that is connected to the lead screw via a plug connection, the lead screw being mounted in the plug connection so as to be displaceable in the direction of the longitudinal axis in order to be displaced together with the bearing housing relative to the input wheel when a snap movement, in particular a snap closure, is triggered.

The at least one hook-shaped latch may in particular be rotatable about an axis of rotation that runs tangential to the longitudinal axis, and in the locked position may engage at a fixing point on the bearing housing, wherein the fixing point is positioned on a different diameter, for example a smaller diameter, than the axis of rotation. As a result, in particular, the illustrated embodiment may readily be achieved, as a self-opening latch.

Preferably, the slide may be supported at least indirectly in the direction of the longitudinal axis and the snap spring may be tensioned in the supported state of the slide by driving the lead screw and consequently displacing the bearing housing in the longitudinal direction. The slide may be supported, for example, indirectly via the support of the valve body in a valve housing, particularly on the valve seat. Alternative means of support are conceivable.

According to one embodiment of the invention, the bearing housing is mounted in a support tube that is displaceable in the direction of the longitudinal axis and has an axial end for connecting a valve housing. Thus, the support tube may be rigidly connected to the valve housing, and the bearing housing, particularly in the form of the hollow cylinder, may be rigidly connected to the valve body. The support tube surrounds the bearing housing, advantageously on its radial outer side, and thus has a larger diameter than the bearing housing, particularly the hollow cylinder of the bearing housing. The at least one latch may preferably be mounted on the support tube, advantageously on an outer side thereof, in order to engage radially from outside into the bearing housing, in particular through recesses made in the support tube, for example slots.

The control ring may be moved in the longitudinal direction together with the bearing housing in order to tension the snap spring, and may thus be displaced via the at least one latch to block the latch in the locked position.

For this purpose, the at least one latch has, preferably on a surface facing toward the control ring, an inclination oblique to the longitudinal axis, on which the control ring acts; and/or the control ring has, on a surface facing the latch, an inclination oblique to the longitudinal axis, with which it acts on the at least one latch. Thus, as a result of the control ring being displaced in the longitudinal direction, the control ring may move the latch into its locked position in engagement with the bearing housing.

According to one embodiment of the invention, a spring plate is fixed to the bearing housing, which encloses the support tube over its radially outer circumference. The snap spring may then be supported on this spring plate in order to transmit the spring force of the snap spring to the bearing housing via the spring plate. For example, the support tube is furnished with slots running in the longitudinal direction, through which the spring plate is fastened to the bearing housing using appropriate struts, bolts or screws. In particular, the other axial end of the snap spring may be supported in a housing of the valve drive and/or on a flange of the support tube.

In accordance with a particularly preferred embodiment of the invention, the locking device has, in addition to the control ring and in particular the magnetic actuator, an axial slide that is connected to the control ring for displacement of the control ring, the axial slide being positioned in the longitudinal direction next to the spring plate and, in an operating state of the valve drive, i.e. before triggering of the snap process, in particular snap closure, forming an axial gap with the spring plate, into which gap the axial slide may be displaced for moving the control ring from the first position to the second position.

Particularly preferably, a transport lock is furnished, which may be manufactured as follows: The spring plate may be moved in the direction of the longitudinal axis by driving the lead screw until it strikes against the axial slide when the control ring is in the first position, i.e. the position in which it blocks the at least one latch from leaving the locked position. When the spring plate approaches the axial slide, the control ring is again blocked from leaving the first position so that it may no longer release the at least one latch. Turning back the lead screw restores the axial gap between the spring plate and the axial slide, so that the transport lock is released and the snap function, in particular the snap-close function, is reactivated.

According to one embodiment of the invention, a test device is furnished for testing the snap function, in particular the snap-close function, without further impairing the functionality of the valve or during operation of the valve. In particular, the test may be performed with the valve fully open, i.e. with the valve body fully lifted from the valve seat. The test device comprises an optionally actuatable test actuator that may be actuated to block the bearing housing in the middle of its displacement path, and in particular may be brought into mechanical engagement with the slide in order to block complete displacement of the bearing housing after release of the locking device, and to release only an initial displacement by means of the snap spring. Thus, in addition to the stop of the valve body on the valve seat or any other "standard operating stop" furnished in "true" snap travel, in particular snap closure, a test stop is created that makes it possible to test-trigger the locking device without closing the valve.

Such a test actuator may, for example, comprise a plunger that may be actuated electromagnetically, pneumatically, hydraulically or otherwise in a radial direction to the longitudinal axis and which engages in a corresponding radial recess in the bearing housing or a component connected to the bearing housing, the recess preferably being formed as a slot. As explained, there may also be engagement with the slide.

According to an alternative configuration, the test actuator has a latch mechanism, for example with one or more hook-shaped latches in turn that are movable in the radial direction and may optionally be brought at least indirectly into the displacement path of the bearing housing, in order to form a test stop for the displacement of the bearing housing.

A valve according to the invention having a snap function, in particular a snap-close function, comprises a valve housing that forms a valve seat and a valve body that is movable relative to the valve seat in order to adjust a flow cross-section formed between the valve seat and the valve body, either between a pure open and closed position or variably, with the slide of a valve drive according to the invention being connected to the valve body.

The valve drive according to the invention is preferably used to operate a valve with that controls or regulates a flow of steam, gas, water, oil or compressed air. This also includes media flows with a share of the aforementioned media or a mixture with at least one of the aforementioned media.

Due to the axial displacement of the bearing housing during snap travel, in particular during snap-close, according to the invention, a safe and fast-acting system may be achieved without interfering with the mechanics of the adjusting movement of the valve drive in a regulating or control operation, if the valve is designed as a combination valve. Due to the preferred arrangement of the hook-shaped latch and the selection of the pivot and fixing point in accordance with the lever length, there are low hold-down forces for the latches, which may simultaneously hold large spring loads of the snap spring. In particular, there are hold-down forces in the range of 0.01 to 0.03 times the spring force of the snap spring.

The magnetic actuator for moving the control ring may preferably comprise an electrically controlled lifting magnet, wherein, when the lifting magnet is de-energized, the control ring is moved into its second position by the spring force, in particular the spring force of the spring system, in order to release the at least one latch.

Because the snap spring is not moved during normal operation of the actuator drive, it is always released from its fully tensioned state during snap travel, in particular during snap closure. In addition, irrespective of the slide position, the full spring force of the snap spring always acts at the beginning of the triggering of snap travel, particularly snap closure.

In order to dampen impact forces during snap travel, in particular during snap closure, at least one shock absorber is preferably furnished, against which the bearing housing strikes at least indirectly. For example, a plurality of parallel-connected mechanical dampers are furnished, having in particular an approximately linear characteristic, and by means of these dampers, the closing time may be determined for snap travel, particularly for snap closure.

Preferably, for safe control of the valve drive, the axial slide of the locking device is moved beyond the locking point of the locking device, i.e. the displacement continues even after the latch has reached its locked position until the axial slide reaches a reference position, from where it is then moved back to an initial working position by driving the lead screw. The reference position may be detected, for example, by closing an electromagnet or the associated drop in current, if, for example, the axial slide strikes the magnetic actuator.

An electronic control apparatus may be furnished that controls the position control and drive control of the valve drive. This device may adjust the preloading of the snap spring in a suitable way, as well as the locking of the locking device and the suitable zero point, i.e. initial working position after commissioning the valve drive and/or after triggering snap travel, in particular a snap closure.

To adjust the position of the slide, the valve drive may be driven in a slow travel mode. After the valve has reached a closed position, the correct closed position may be determined by detecting an increase in current in the drive motor. Then the drive may be moved to its fully open position and the stop in the fully open position may again be detected by detecting the necessary motor current. In particular, if in this state the snap spring is fully tensioned and the control ring is in contact with the magnetic actuator (holding magnet), the magnetic actuator may be switched on to hold the at least one latch and the associated mechanical engagement in the bearing housing.

If the drive is now moved in the opposite direction, the mechanical stop is left and within a small travel distance, usually only a few millimeters, the detectable motor current falls below a parameterizable threshold. The locking device alone now holds back the spring force of the snap spring.

Preferably, the parameterized working stroke of the valve drive may now be moved in a closing direction and overrun, so that the motor current rises again above a parameterizable threshold. The inner mechanical stop of the valve drive or the mechanical stop of the coupled valve, for example a steam valve, is then reached. Thus, a zeroing of an actual position measurement may be performed and normal operation may be enabled to move the valve drive to a certain stroke position according to a predetermined setpoint.

BRIEF DESCRIPTION OF THE SEVERAL VIEWS OF THE DRAWING

The invention is described below with reference to an exemplary embodiment and the drawings, by way of example.

DETAILED DESCRIPTION OF THE INVENTION

Figure 1:
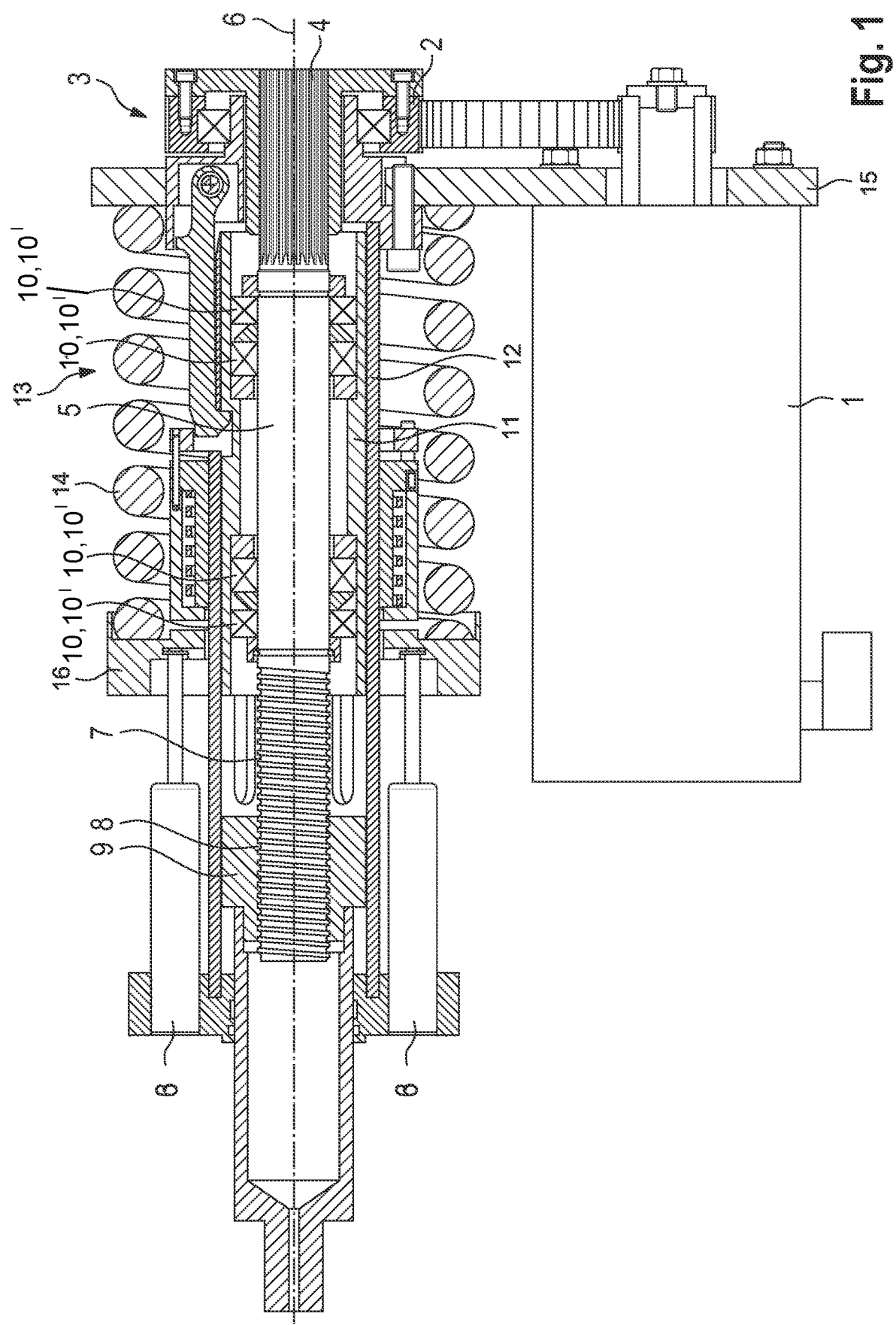
FIG. 1 an illustration of an exemplary embodiment of a valve drive according to the invention.

The valve drive shown in FIG. 1 is driven by means of an electric motor 1. This electric motor 1 drives an input wheel 2 of a rotary drive input 3 of the valve drive via a transmission, in this case a spur toothing. In the exemplary embodiment shown, the input wheel 2 has a corresponding external toothing.

The input wheel 2 is drive-connected with a lead screw 5 via a spline 4. In the exemplary embodiment shown, the spline 4 has a length in the direction of the longitudinal axis 6 such that the lead screw 5 may be moved away from the input wheel 2 in the direction of the longitudinal axis 6, without losing the engagement of the input gearwheel 2 with the spline 4.

At the axial end facing away from the spline 4, the lead screw 5 has an external thread 7 that engages with an internal thread 8 of a slide 9. The slide 9 is secured against a rotation; for example, it is secured against rotation in the support tube 12 by means of a feather key. Thus, by rotating the lead screw 5, depending on the direction of rotation the slide 9 is moved in the direction of the longitudinal axis 6. The lead screw 5 and the slide 9 thus form a worm gear to convert a rotary movement into a linear movement.

An actuator for a valve body not shown in greater detail in FIG. 1, or simply a valve stem of a corresponding valve body, is connected to the slide 9, so that the valve body is moved in the direction of the longitudinal axis 6 together with the slide 9.

The lead screw 5 is mounted in the bearing housing 11 in an axial section positioned between the spline 4 and the external thread 7, with bearing positions 10 forming an axial-radial bearing 10'. In the exemplary embodiment shown, the bearing housing 11 comprises a hollow cylinder that is mounted in the support tube 12 so that it may be displaced in the direction of the longitudinal axis 6. Thus, the bearing housing 11 together with the bearing positions 10, the lead screw 5 mounted therein, slide 9 mounted thereon and also the valve body not shown here in detail, may be displaced in the direction of the longitudinal axis 6.

A locking device 13 blocks the bearing housing 11 against such displacement in the direction of the longitudinal axis 6, as long as the locking device 13 is not released. If, on the other hand, the locking device 13 is released, a snap-close spring (in general, a snap spring) 14, which is supported on one side against a valve drive housing 15 that carries the support tube 12, and is supported on the other side against a spring plate 16 that is rigidly fastened to the bearing housing 11, pushes the bearing housing 11 away from the input wheel 2 in the direction of the longitudinal axis 6, and thus in the direction of the valve body not shown here or a valve seat associated therewith, in order to close the valve. This is what is referred to as the snap-close of the valve drive or the valve driven by the valve drive.

In the normal state, however, the locking device 13 keeps the snap-close spring 14 in its pre-loaded condition and the bearing housing 11 in its non-extended position as shown in FIG. 1, and the valve body is adjusted solely by displacing the slide 9 by means of a rotary movement of the lead screw 5 initiated by the input wheel 2.

In the exemplary embodiment shown, the snap-close spring 14 encloses the support tube 12 and the bearing housing 11 on their radially outer circumference. Thus, the snap-close spring 14 may be designed with a comparatively large diameter. In the exemplary embodiment shown, the locking device 13 is also completely positioned within the snap-close spring 14.

Shock absorbers 36 are furnished that dampen the movement of the bearing housing 11 in the direction of the longitudinal axis 6 in the case of a snap-close. A shock absorber 36 may be sufficient. Preferably, the at least one shock absorber 36 is replaceable as a wear part. The positioning shown in the area of one axial end of the lead screw 5 is suitable for this purpose. In the exemplary embodiment shown, the at least one shock absorber 36 engages an axially opposite side, such as the snap-close spring 14 engaging the spring plate 16; and with the opposite axial end, for example, it engages the valve drive housing 15 and/or a flange on the support tube 12.

Figure 2:
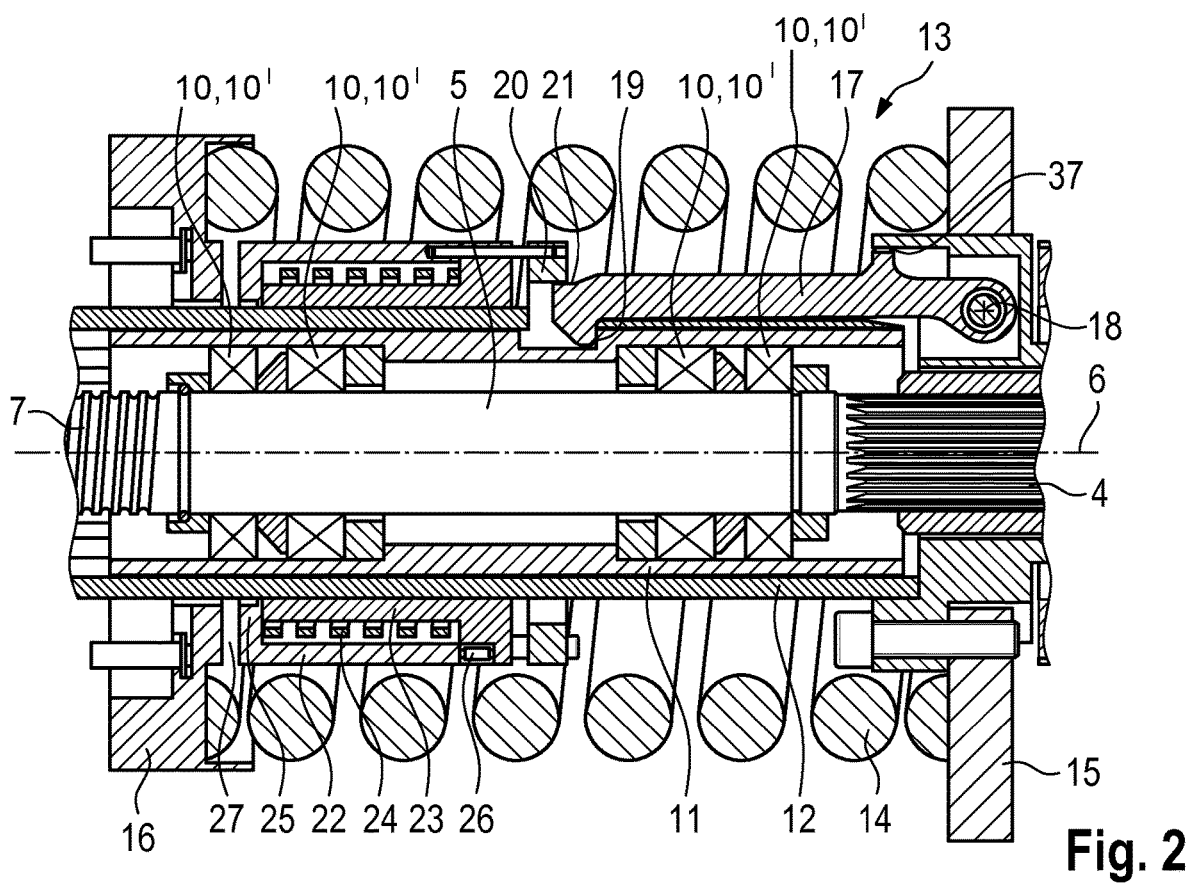
FIG. 2 a cutaway of FIG. 1 in the region of the locking device.

The locking device 13 is explained below using the cutaway of FIG. 1 shown in FIG. 2. In the exemplary embodiment shown, the locking device 13 has at least one, preferably a plurality of hook-shaped latches 17. The hook-shaped latches 17 are for example positioned in alignment with each other in the circumferential direction and distributed over the circumference of the bearing housing 11. The function of the latch 17 will be explained below using the one latch 17 shown in the axial section in FIG. 2. The latch 17 has an axis of rotation 18 that is aligned tangentially to the longitudinal axis 6 and to the bearing housing 11, respectively, via which it may be moved radially relative to the bearing housing 11. In a locked position, as shown in FIG. 2, the latch 17 engages radially from the outside into the bearing housing 11 and fixes the bearing housing 11 at a fixing point 19, which is formed by an axial stop in the bearing housing 11, against displacement of the bearing housing 11 in the direction of the longitudinal axis 6 due to the preload force of the snap-close spring 14. The fixing point 19 is in particular positioned on a smaller diameter than the axis of rotation 18. The engagement of the latch 17 in the bearing housing 11 may be achieved by a recess, for example a slot in the support tube 12.

The latch 17 itself is in turn blocked by a control ring 20 that overlaps the latch 17 radially from the outside at one axial end and thus prevents the latch 17 from moving radially outward by twisting around the axis of rotation 18. The control ring 20 or, as shown, the latch 17, may have a surface 21 that is oblique to the longitudinal axis 6 in the axial section shown, which ensures that when the control ring 20 is pushed onto the latch 17 in the direction of the longitudinal axis 6, the latch 17 is pressed radially inwards to come into contact with the fixing point 19.

If, on the other hand, the control ring 20 is pushed away from the latch 17 and releases the latch 17 on its radially outer side, then because the latch 17 is designed as a self-opening latch, i.e. the surfaces facing each other at the fixing point 19 are not arranged to be self-locking, the latch 17 cannot restrain the compressive force of the snap-close spring 14 and moves radially outward to release the bearing housing 11 for displacement along the longitudinal axis 6.

The control ring 20 is held by the axial slide 22 connected to it in its first position, shown in FIG. 2, in which it holds the latch 17 in the locked position as long as the electromagnetic force of the magnetic actuator 23 holds the axial slide 22 in place. The magnetic actuator 23 has a corresponding winding 24 which, when energized, exerts a magnetic force on a magnetizing element 25 of the magnetic actuator 23 and thereby keeps the magnetizing element 25 adjacent to or at a distance from an end face of the magnetic actuator 23 with a minimum predetermined gap; the control ring 20 being held in turn in this position radially on the outside of the latch 17.

If, on the other hand, the magnetic force of the magnetic actuator 23 is insufficient, for example because the magnetic actuator 23 is de-energized, the axial slide 22, and with it the control ring 20 connected thereto, moves away from the latch 17. The necessary adjustment force is generated by a spring accumulator 26, which, for example, first generates a comparatively large breakaway force that loosens any adhesion of the tightening element 25 on the magnetic actuator 23, and then generates a comparatively smaller displacement force to remove the tightening element 25 from the magnetic actuator 23 in the direction of the longitudinal axis 6. In the exemplary embodiment shown, the spring accumulator 26, for example, engages on the front face of the axial slide 22, and also on a radial projection of the magnetic actuator 23, which in turn is fixed from the outside to the support tube 12.

Tensioning the snap-close spring 14 may be done particularly easily by driving the lead screw 5 by means of the electric motor 1 (see FIG. 1) until the slide 4 [sic] is supported at least indirectly, for example via the valve body, on a counter-surface, for example the valve seat, so that by further rotating the lead screw 5, the lead screw 5 is moved together with the bearing housing 11 in the direction of the rotary drive input 3, while at the same time the spring plate 16 takes the control ring 20 along via the axial slide 22 and pushes it over the latch 17, so that the latch 17 is moved radially inward into the recess furnished for it in the bearing housing 11. If the lead screw 5 is then turned back slightly, the latch 17 comes into contact with the fixing point 19 and the lead screw 5 is in its zero position.

In order to ensure that at least one latch 17 is secured in the recess in the bearing housing 11, irrespective of the respective position of the latch 17 and of any weight forces acting thereon, an elastic return spring may be furnished that exerts a radial force on the latch 17 from the outside in. The return spring may, for example, be arranged as a compression spring 37 on a radially outward-directed projection of the latch, and may be supported against part of the valve drive housing 15.

In addition, the valve drive may be secured for transport by rotating the lead screw 5 until the spring plate 16 bridges the axial gap 27, into which the axial slide 22 plunges when the snap-close closure is triggered, and thus forces the control ring 20 to remain radially outside the latch or latches 17.

Preferably, a position sensing, in particular electrical position sensing for example with a reed contact, is furnished that detects the position of the control ring 20 and/or the axial slide 22. In this way, for example, commissioning of the valve drive may be avoided until the transport lock is released. Such position sensing may also be used for calibrating the valve drive.

Figure 3:
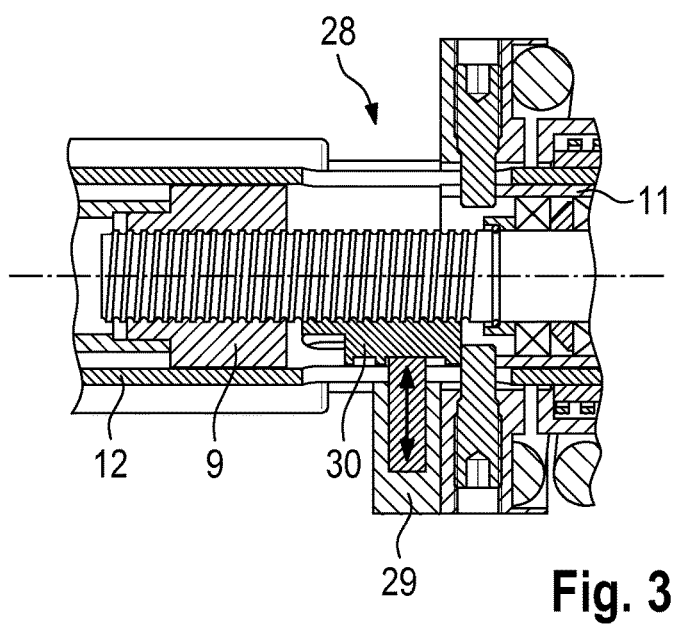
FIG. 3 an exemplary embodiment of a test device.

FIG. 3 shows an exemplary test device 28 having a test actuator 29 that may be moved at least indirectly into the displacement path of the bearing housing 11 in order to block the bearing housing 11, so that when the test actuator 29 is active, the bearing housing 11 may only move over part of its displacement path. In the exemplary embodiment shown, the bearing housing 11 has a corresponding axial extension into which the test actuator 29 positively plunges. Alternatively, the test actuator 29 could also plunge into the slide 9 with a corresponding positive fit.

The test device 28 enables a test of the snap-close with the valve open, i.e. without the valve body moving down to the valve seat.

Figure 4:
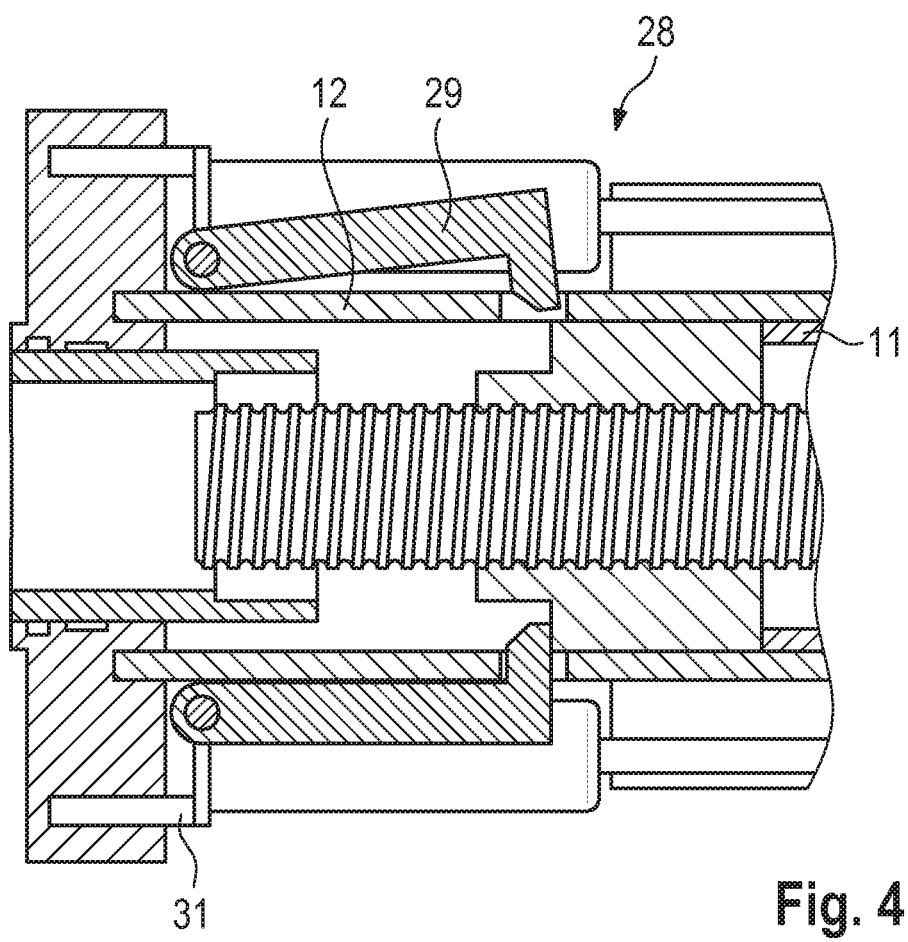
FIG. 4 another exemplary embodiment of a test device.

FIG. 4 schematically depicts an alternative embodiment of a corresponding test device 28. In this configuration, the test actuators 29 are designed as hook-shaped latches, which may accordingly pass radially from the outside through the support tube 12 to block the bearing housing 11 against any further displacement. The test actuators 29 may be actuated by axial plungers 31, for example by electromagnetic plungers.

Figure 5:
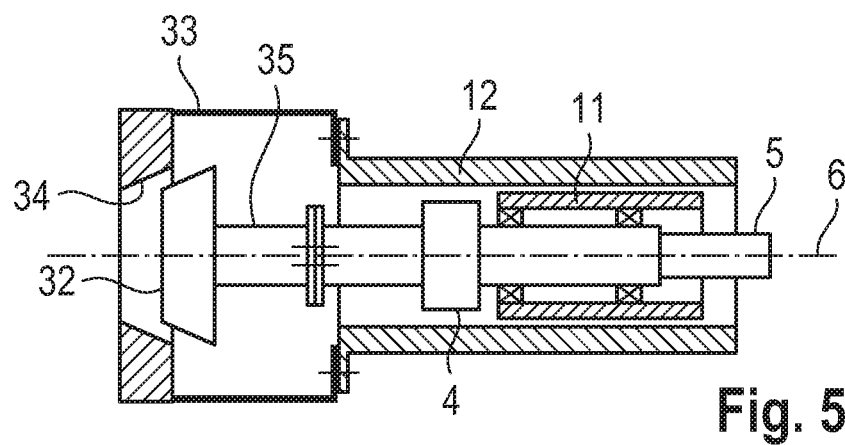
FIG. 5 a schematic diagram of a valve with a corresponding valve drive.

FIG. 5 shows, in a highly schematic fashion, a valve with a corresponding valve drive, comprising a valve body 32 and a valve housing 33 with a valve seat 34 and valve stem 35. The valve housing 33 is rigidly connected to the support tube 12, and the valve stem 35 is rigidly connected to the slide 4. A largely concentric alignment along the longitudinal axis 6 is thus possible.

Although the invention has previously been illustrated by means of a valve drive with a snap-close function, the invention is also applicable to a valve drive that, when triggered, causes the valve to open quickly or abruptly (snap-release function). Accordingly, for example, the locking device 13 and the components cooperating with it may be positioned at the other axial end of the lead screw 5 so that the direction of action of the snap-close spring 14, which in this case could also be called the snap-release spring, is in the direction away from valve body 32. However, the rotary drive input 3 and the slide 9 could remain at the position shown. Alternatively, the valve may also be modified so that the snap-release function is achieved.

LIST OF REFERENCE SIGNS

1 Electric motor
2 Input wheel
3 Rotary drive input
4 Spline
5 Lead screw
6 Longitudinal axis
7 External thread
8 Internal thread
9 Slide
10 Bearing position
10' Rolling bearing
11 Bearing housing
12 Support tube
13 Locking device
14 Snap spring/snap-close spring
15 Valve drive housing
16 Spring plate
17 Latch
18 Rotation axis
19 Fixing point
20 Control ring
21 Surface
22 Axial slide
23 Magnetic actuator
24 Winding
25 Tightening element
26 Spring accumulator
27 Axial gap
28 Test device
29 Test actuator
30 Extension
31 Plunger
32 Valve body
33 Valve housing
34 Valve seat
35 Valve stem
36 Shock absorber
37 Compression spring

The invention claimed is:

1. A valve drive with a snap function, the valve drive comprising:
 a snap spring having a preload force;
 a releasable locking device;
 a bearing housing held against a displacement along a longitudinal axis by said releasable locking device, countering said preload force of said snap spring;
 a rotary drive input;
 a lead screw connected to or formed by said rotary drive input, said lead screw being mounted in said bearing housing so as to be rotatable about said longitudinal axis and stationary in a direction of said longitudinal axis; and
 a slide disposed in threaded engagement with said lead screw to form a screw thread, said slide being mechanically connected or connectable to a valve body and being movable in a direction of said longitudinal axis;
 during a snap function of the valve drive, said bearing housing, a threaded spindle mounted in said bearing housing and said slide being displaceable together in the direction of said longitudinal axis due to said preload force of said snap spring of the valve drive; and
 during a normal control operation of the valve drive, said bearing housing being held by said releasable locking device against displacement of said bearing housing together with said screw mounted in said bearing housing in the direction of said longitudinal axis against said preloading force of said snap spring.

2. The valve drive according to claim 1, wherein said bearing housing includes a hollow cylinder enclosing bearing positions or rolling bearings and enclosing at least one axial section of said lead screw.

3. The valve drive according to claim 2, wherein said snap spring is a compression spring or compression coil spring radially outwardly surrounding said bearing housing.

4. The valve drive according to claim 1, wherein:
 said locking device includes at least one hook-shaped latch being movable in radial direction relative to said bearing housing; and
 said at least one latch has:
  a first locked position being locked with a form-locking radially outward engagement in said bearing housing; and
  a second snap position canceling said engagement in said bearing housing for moving said bearing housing acted upon by said preload force of said snap spring in said direction of said longitudinal axis.

5. The valve drive according to claim 4, which further comprises a control ring surrounding said at least one latch in a radial direction and being movable in said direction of said longitudinal axis between a first position in which said control ring blocks said at least one latch from moving out of said locked position and a second position in which said control ring releases a movement of said at least one latch.

6. The valve drive according to claim 5, which further comprises a magnetic actuator holding said control ring in said first position against a spring force.

7. The valve drive according to claim 6, which further comprises a spring accumulator generating said spring force, for generating an initially increased breakaway force during a movement of said control ring from said first position into said second position.

8. The valve drive according to claim 5, wherein said control ring encloses said at least one latch.

9. The valve drive according to claim 5, which further comprises a support tube being displaceable in said direction of said longitudinal axis, said support tube having an axial end for connecting to a valve housing, and said bearing housing being mounted in said support tube.

10. The valve drive according to claim 9, wherein said at least one latch is rotatably mounted on said support tube.

11. The valve drive according to claim 9, which further comprises a spring plate being fixed to said bearing housing, said spring plate surrounding a radially outer circumference of said support tube, and said spring plate supporting said snap spring.

12. The valve drive according to claim 11, wherein:
   said locking device includes an axial slide connected to said control ring for displacing said control ring;
   said axial slide is positioned next to said spring plate in said direction of said longitudinal axis;
   in one operating state of the valve drive, said axial slide forms an axial gap with said spring plate; and
   said axial slide is displaceable into said gap for moving said control ring from said first position to said second position.

13. The valve drive according to claim 12, wherein said spring plate is movable in said direction of said longitudinal axis for a transport state by driving said lead screw until said lead screw strikes against said axial slide when said control ring is in said first position.

14. The valve drive according to claim 5, wherein said control ring is movable in said longitudinal direction together with said bearing housing for tensioning said snap spring and said control ring is consequently displaceable by said at least one latch for blocking said snap spring.

15. The valve drive according to claim 14, wherein said at least one latch and said control ring have at least one of the following engagements:
   said at least one latch has a surface on which said control ring engages, and said surface has an oblique inclination facing toward said control ring relative to said longitudinal axis, or
   said control ring has a surface facing and engaging on said at least one latch, and said surface has an inclination relative to said longitudinal axis.

16. The valve drive according to claim 4, wherein said at least one latch is a self-opening latch.

17. The valve drive according to claim 4, wherein said at least one latch of said locking device is disposed at a circumference of said bearing housing.

18. The valve drive according to claim 4, wherein:
   said at least one latch is rotatable about an axis of rotation aligned tangentially to said longitudinal axis;
   said at least one latch engages said bearing housing at a fixing point in said first locked position; and
   said fixing point is positioned on a different diameter or a smaller diameter than said axis of rotation.

19. The valve drive according to claim 1, wherein said rotary drive input includes an input wheel or input gear connected to said lead screw by a plug connection, said lead screw being mounted inside said plug connection so as to be displaceable along said longitudinal axis and so as to be displaced relative to said input wheel together with said bearing housing.

20. The valve drive according to claim 1, wherein:
   said slide is configured to be supported at least indirectly in said direction of said longitudinal axis in a supported state; and
   said snap spring is configured to be tensioned by driving said lead screw and consequently by displacing said bearing housing in said longitudinal direction in said supported state of said slide.

21. The valve drive according to claim 1, which further comprises a test device including a selectively actuatable test actuator configured to be actuated to block said bearing housing in a middle of a displacement path of said bearing housing or to be brought into mechanical engagement with said slide for blocking a complete displacement of said bearing housing after a release of said locking device and for releasing only an initial displacement by said snap spring.

22. A valve with a snap function, the valve comprising:
   a valve drive according to claim 1;
   a valve housing forming a valve seat; and
   a valve body connected to said slide, said valve body being movable relative to said valve seat for adjusting a flow cross-section formed between said valve seat and said valve body between a completely open position, a completely closed position and a variable position.

23. A method of actuating a valve, the method comprising the following steps:
   using a valve drive according to claim 1 for actuating the valve to control or regulate a flow of steam, gas, water, oil or compressed air.

* * * * *